June 22, 1965   L. G. GITZENDANNER   3,191,079
HEAVY DYNAMOELECTRIC MACHINE HAVING NYLON BEARINGS
Filed Oct. 31, 1960   2 Sheets-Sheet 1
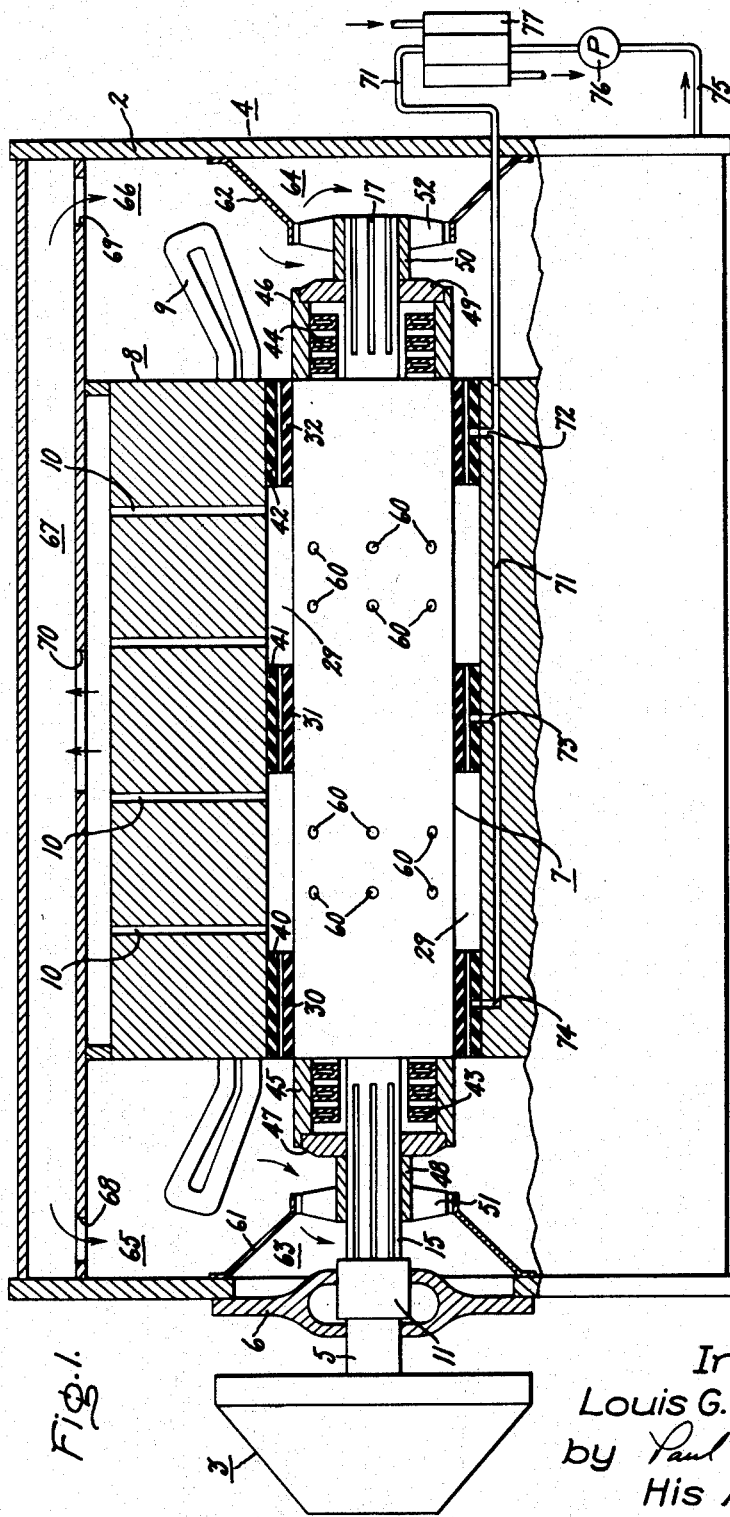
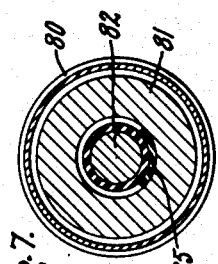
Fig.7.
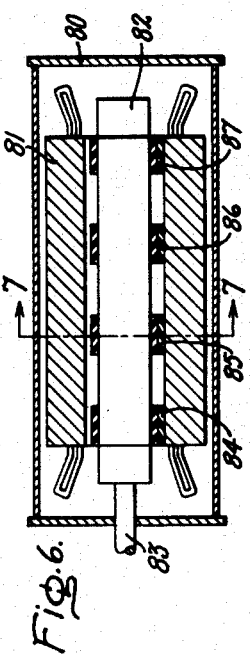
Fig.6.
Fig.1.
Inventor:
Louis G. Gitzendanner,
by Paul A. Frank
His Attorney.

June 22, 1965     L. G. GITZENDANNER     3,191,079
HEAVY DYNAMOELECTRIC MACHINE HAVING NYLON BEARINGS
Filed Oct. 31, 1960     2 Sheets-Sheet 2

Inventor:
Louis G. Gitzendanner,
by Paul A. Frank
His Attorney.

United States Patent Office 3,191,079
Patented June 22, 1965

3,191,079
HEAVY DYNAMOELECTRIC MACHINE
HAVING NYLON BEARINGS
Louis G. Gitzendanner, Scotia, N.Y., assignor to General Electric Company, a corporation of New York
Filed Oct. 31, 1960, Ser. No. 65,974
3 Claims. (Cl. 310—55)

The present invention relates to dynamoelectric machines and, more particularly to dynamoelectric machines having improved rotor constructions.

The trend in turbine driven dynamoelectric machines is toward large capacity machines to permit the generation of inexpensive power. By increasing the generative capacity of such machinery, operating and construction problems are greatly magnified. For example, it is often necessary to utilize hydrogen gas for cooling stator and rotor windings in such machinery and with greater capacity requirements, the pressure at which such cooling medium is circulated has also been increased. From the standpoint of physical construction, such rotors have increase in length to greater than 30 feet and because of the rotor mass, the end bearings have reached a size in excess of two feet in diameter. Further, these rotors in operation are subject to large bending and centrifugal stresses. The bending stresses are not easily accommodated since the diameter of a rotor is limited by considerations such as the large centrifugal forces generated by presently utilized two-pole machines and further by the metallurgical limitations of the material from which the rotor is fabricated. Accordingly, it can be seen that with the increased demand for larger power output machinery, it has been extremely difficult to meet this demand with existing knowledge in the areas of metallurgy and strength of materials.

The chief object of the present invention is to provide an improved dynamoelectric machine.

Another object of the invention is to provide an improved rotor construction for dynamoelectric machines.

A still further object of the present invention is to provide improved dynamoelectric machine constructions making possible longer rotors by providing bearing means in the magnetic gap between the rotor and stator to limit bending stresses in the rotor.

A still further object of the invention is to provide an improved rotor construction for dynamoelectric machines wherein the rotor is fabricated of plate members and is provided with suitable journal means for engaging bearing means located in the magnetic gap of the machine.

These and other objects of my invention will become more apparent from the following description.

Briefly stated, the present invention relates to dynamoelectric machines including a stator which envelopes a rotor fabricated from a plurality of axially spaced plates and having journal means which engage bearings located in the magnetic gap between the rotor and the stator.

The attached drawings illustrate preferred embodiments of the invention, in which:

FIGURE 1 is a view in section schematically showing a turbine driven dynamoelectric machine employing the present invention;

FIGURE 6 is a sectional view of another embodiment of the invention; and

FIGURE 7 is a sectional view of the embodiment shown in FIGURE 6 taken through line 7—7.

Figure 2:
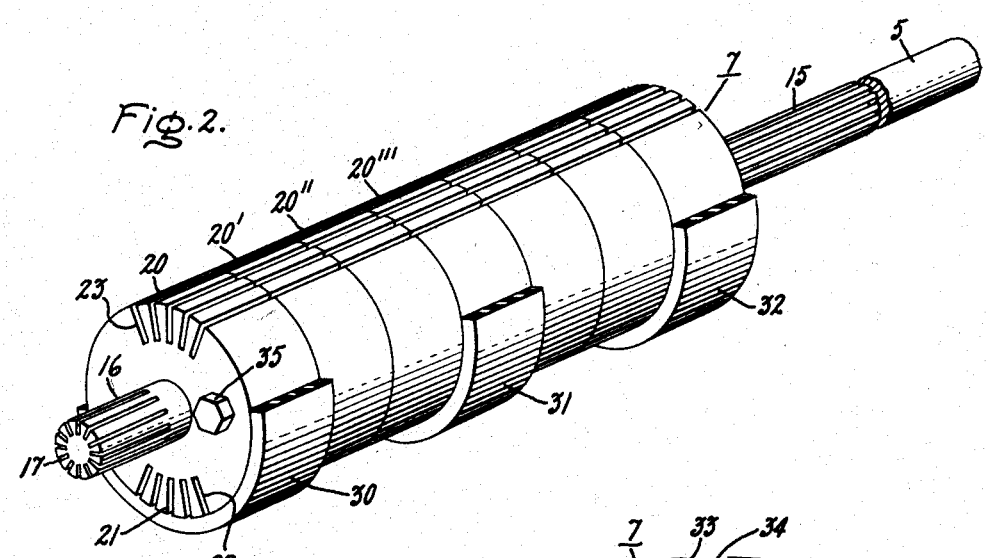
FIGURE 2 is a perspective view partially in section of the rotor construction utilized in the apparatus shown in FIGURE 1.

In the drawings, a totally enclosed dynamoelectric machine such as the turbine-generator unit shown in FIGURE 1 comprises a generator 2 and a schematically shown turbine 3. Generator 2 includes hermetic casing 4 including a sealing gland 6 through which shaft 5 connected to turbine 3 extends. Sealing gland engages raised portion 11 of shaft 5 to assure that the inside of casing 4 is sealed from the atmosphere. Generator 2 generally comprises a rotor 7 and a stator 8. Stator 8 in the present embodiment may be of a conventional type with windings 9 mounted therein and having a plurality of radially disposed passages 10 through which cooling medium is passed in a manner described more fully hereinafter.

The nature of rotor 7 may be more fully understood by referring also to FIGURES 2, 3, 4, and 5. FIGURE 2 is a perspective view of the rotor without the windings illustrated. The ends of the rotor include stub shafts 5 and 16, stub shaft 5 having suitable splines 15 and stub shaft 16 having splines 17 which extend to the end of the shaft. The rotor comprises a plurality of plate members 20, 20', 20'', 20''', etc. In the prior art, in order to achieve maximum strength, a single piece forged steel construction is utilized. At higher speeds in prior art rotors, more specialized materials are necessary because the usual two-pole machine operates at 3600 r.p.m. generating tremendous centrifugal stresses in the forged material. Since the stresses are a function of the diameter of the rotor, rotors have generally been limited to approximately four feet in diameter. The diameter of a rotor currently limits its practical length since as the rotor is lengthened, it will be necessary to pass through more critical speeds to reach operating speed and the risk of encountering excessive vibration is greatly increased.

In fabricating integral forged steel rotors, because of the size of the rotor, control of the metallurgical properties of the material is difficult and these properties may vary throughout the forging. By supporting the rotor on end bearings, high stresses are induced in portions of the forging and suitable design precautions must be taken in view of the possible poor quality of the material in these areas.

The present invention provides better quality rotors by forming each rotor from plate member sections of comparatively small size. Individual plates permit greater quality control during forging thereby assuring better material in each forging. The individual plates may be of a size such that heat treating to achieve optimum metallurgical properties is feasible. These plates have greater strength and uniform characteristics and they can be readily inspected for defects. Machining of plates may be performed before fabrication of the rotor. Inventory of rotors may be reduced to individual plates which may be utilized in a broad range of rotor sizes. The cost of rejects is considerably less since only individual plate members are discarded. The facilities required to fabricate rotors are less expensive because smaller members are being machined. Another advantage is that winding ventilation means may be readily provided by such unit construction.

Figure 4:
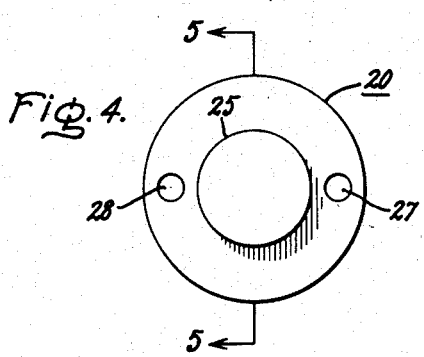
FIGURE 4 is a view of a typical plate member utilized in the fabrication of the rotor illustrated in FIGURE 2.
Figure 5:
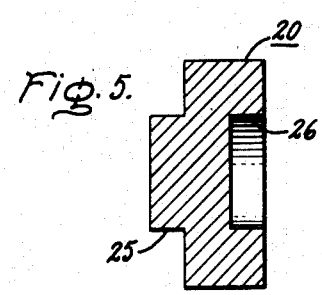
FIGURE 5 is a sectional view taken through line 5—5 shown in FIGURE 4.

A typical disc or plate member 20 is shown in FIGURE 4 and may comprise a short cylindrical member less than approximately 2 feet in length and may include a cylindrical protuberance 25 on one end thereof, the other end being provided with a cylindrical recess 26 adapted to receive a cylindrical protuberance 25 from an adjacent plate. By this rabbeted construction, the shoulders of the cylindrical protuberances and cylindrical openings support adjacent plates which comprise the rotor. Fastening means may be utilized to connect the plates; for this purpose, each plate may be provided with openings 27 and 28 through which suitable bolts 35 may be passed. The end members which comprise the rotor may vary from those shown in FIGURES 4 and 5 since these members may include suitable means for the connection of stub shafts 5 and 16 or if desired, these stub shafts may be integrally formed into the end plate members.

Figure 3:
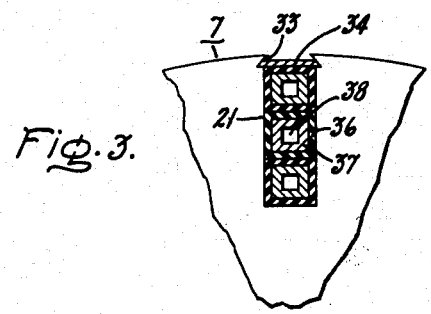
FIGURE 3 is a fragmentary sectional view of conductors utilized in the slots of the rotor illustrated in FIGURE 2.

Rotor 7 shown in FIGURE 2 is provided with slots 21. In a two-pole machine these slots may be formed in two groups 22 and 23. In FIGURE 3 there is shown a fragmentary sectional view of a portion of rotor 7 illustrating the manner in which windings are mounted in the rotor. Slot 21 has a general rectangular cross section; however, adjacent the periphery of the rotor, suitable dovetail type grooves 33 are formed in the slot walls adapted to seat a conventional top stick 34 utilized to retain the windings. The windings may be of any desired conventional form. In FIGURE 3, the conductors are of the type wherein cooling medium is passed through the conductor inside the ground insulation. Ground insulation 36 envelops conductor 37 which has an opening 38 therein through which cooling medium such as hydrogen gas may be passed to remove heat from the conductor. The manner in which cooling medium may be supplied adjacent the conductors to carry heat therefrom is more fully described hereinafter. Three conductors are shown in slot 21. It will be appreciated that the number of conductors in the slots may vary and the conductor configuration may also be varied within the spirit of the present invention.

In FIGURE 2 there is shown a plurality of journals 30, 31, and 32 which are adapted to support the rotor during rotation. In the prior art, journals are provided at the ends of the rotor. In the present embodiment of the invention, these journals are mounted on the rotor in such a manner as to at least partially envelope the windings. The relationship of journal members 30, 31, and 32 with respect to stator 8 is illustrated in FIGURE 1. Journal members 30, 31, and 32 engage bearing members 40, 41, and 42 which are located in air gap 29, the bearing members being mounted in stator 8.

In FIGURE 1 further details of rotor 7 are illustrated including winding ends 43 and 44 of the rotor windings which pass through the body of the rotor, the ends being covered and enclosed by suitable shroud rings 45 and 46 and end rings 47 and 49. Sleeves 48 and 50 are mounted on the stub shafts adjacent the end rings for the purpose of covering spline openings 15 and 17 in the stub shafts and also for mounting axial fans 51 and 52 thereon.

In conventional high capacity dynamoelectric machines, the usual way to provide cooling through the stator and rotor windings is to circulate hydrogen gas therethrough. In the embodiment shown in FIGURE 1, such gas is cooled in an adjacent interchanger 67 and passed through opening 68 and 69 into chambers 65 and 66 which are located at each end of casing 4. The cooled hydrogen passes radially inward toward axial fans 51 and 52, the ends of the fans being suitably shrouded by partitions 61 and 62 in such a manner as to define plenum chambers 63 and 64 located at the ends of the rotor. The gas passing through the axial fans is suitably compressed, passed through plenum chambers 63 and 46, through spline openings 15 and 17 to the cavities defined by shroud rings 45 and 46 and end rings 47 and 49. The cooled hydrogen gas is placed under pressure in contact with the end windings 43 and 44 which are provided with suitable openings to permit the passage of gas therethrough into heat exchange relation with the conductors. In the embodiment of the windings shown in FIGURE 3, the gas is passed inside the ground insulation of the conductors which constitute the windings. The gas passes toward the center portion of rotor 7 and in a conventional manner the gas is discharged radially outwardly through discharge openings 60 into gap 29 between the rotor and the stator. This gas passes radially through openings 10 provided in stator 8 and discharged through opening 70 into interchanger 67 where the gas is cooled. It is appreciated that other methods of cooling may be provided such as the utilization of liquid coolant for the stator windings while still practicing the present invention.

As previously mentioned, suitable bearing means are provided in the magnetic gap between the rotor and stator. In the prior art, such bearings are provided at each end of the rotor. The disadvantage of the prior art, namely, the utilization of single, large forgings which are subjected to high bending stresses is obviated by intermediate bearings supporting the rotor in the magnetic gap between the rotor and the stator thereby permitting the use of a rotor construction fabricated from a plurality of plate members 20. In the embodiment in FIGURE 1 annular bearing members 40, 41, and 42 are provided in the magnetic gap. The bearing and journal members may be fabricated of non-magnetic materials and preferably of non-magnetic, electrically non-conducting materials such as plastics, for example, nylon, polyesters, and epoxy resins. If the use of metals for this purpose is desirable, materials such as German silver or brass may be utilized. The use of such materials in the magnetic gap which in a conventional machine may be between 2 inches and 4 inches does not adversely affect the electrical and magnetic characteristics of the machine.

Suitable means may be provided to lubricate the surfaces of the bearing members and journal members. Initially, lubricant is cooled in heat exchanger 77 and supplied to line 71 which may be extend through stator 8. Line 71 is in communication through passages 72, 73, and 74 with the areas between the bearing and journal members. In this manner, lubricant is supplied to the bearing surfaces to permit hydrodynamic or static support of the rotor. The lubricant from the bearings may be passed into the lower portion of casing 4 which acts as a sump to permit the return of lubricant through line 75 through pump 76 to heat exchanger 77 where the cycle of lubrication supply is repeated.

In FIGURE 6, there is shown a diagrammatic view of another embodiment of the invention wherein stator 81 and rotor 82 are mounted in casing 80, rotor 82 having a shaft 83 adapted to be connected to a suitable turbine (not shown). In this embodiment, four bearing members 84, 85, 86, and 87 are utilized to support the rotor. It can be seen in the sectional view shown in FIGURE 7 that the bearings in this embodiment do not extend a full 360°. Since the bearing load is mainly due to the rotor mass, a supporting surface is provided which extends only approximately 90°. In this manner, the reduced bearing surfaces may reduce bearing losses due to drag making a more effective bearing construction.

The present invention is directed to dynamoelectric machine constructions permitting larger capacity machines to be fabricated in a more economical manner. This is made possible by fabricating the rotor from a number of plate sections, the fabrication of these sections being more easily and economically achieved than the fabrication of the large forgings presently being utilized. The rotor furthermore does not experience the large bending stresses encountered in the prior art because of the bearing supports located in the magnetic gap of the machine.

While I have described preferred embodiments of my invention, it will be understood that my invention is not limited thereto since it may be otherwise embodied within the scope of the appended claims.

What I claim as new and desire to secure by Letters Patent of the United States is:

1. A turbine-driven generator having in combination a stator, a rotor inductively associated with said stator, said rotor having suitable windings enveloped with suitable ground insulation, means for passing cooling medium within said ground insulation and discharging the cooling medium radially outwardly between the stator and rotor, journal means at least partially enveloping said rotor windings, bearing means operatively engaging said journal means, said bearing means being substantially enveloped by said stator, said journal and bearing means being fabricated of non-magnetic material.

2. A turbine-driven generator having in combination a stator, a rotor inductively associated with said stator, said rotor having suitable windings, said windings being enveloped with suitable ground insulation, means for passing cooling medium inside said ground insulation and discharging the cooling medium radially outwardly between the stator and rotor, said rotor being fabricated from a plurality of axially spaced plates having suitable fastening means for connecting said plate members into a unitary structure, journal means at least partially enveloping said rotor windings, bearing means operatively engaging said journal means, said bearing means being substantially enveloped by said stator, and said journal and bearing means being fabricated of non-magnetic material.

3. A turbine-driven generator as recited in claim 1 wherein said bearing means engages only a substantially arcuate portion of the journal means at a given time.

References Cited by the Examiner
UNITED STATES PATENTS 2,917,644 12/59 Laffoon et al. _____ 310—55
2,935,757 5/60 Phillips.

OTHER REFERENCES

Publication: Pages 153–158, March 1954 (Machine Design).

ORIS L. RADER, *Primary Examiner.*

MILTON O. HIRSHFIELD, *Examiner.*

UNITED STATES PATENT OFFICE
CERTIFICATE OF CORRECTION

Patent No. 3,191,079                                              June 22, 1965

Louis G. Gitzendanner

It is hereby certified that error appears in the above numbered patent requiring correction and that the said Letters Patent should read as corrected below.

Column 6, lines 12 and 13, strike out "2,917,644   12/59   Laffoon et al.------------310-55   2,935,757   5/60   Phillips" and insert instead the following:

| | | |
|---|---|---|
| 2,251,816 | 8/41 | Arutunoff---------310/90 |
| 2,666,677 | 1/54 | Miller------------310/90 |
| 2,781,464 | 2/57 | Timms-------------310/90 |
| 2,917,644 | 12/59 | Laffoon et al.----310/55 |
| 2,920,219 | 1/60 | Beckwith----------310/55 |
| 2,935,757 | 5/60 | Phillips. |

FOREIGN PATENTS 567,854              8/30             Germany.

Signed and sealed this 16th day of November 1965.

(SEAL)
Attest:

ERNEST W. SWIDER                              EDWARD J. BRENNER
Attesting Officer                               Commissioner of Patents